T. S. GRIMES.
COTTON GIN.
APPLICATION FILED JUNE 1, 1915.

1,241,466.

Patented Sept. 25, 1917.
2 SHEETS—SHEET 1.

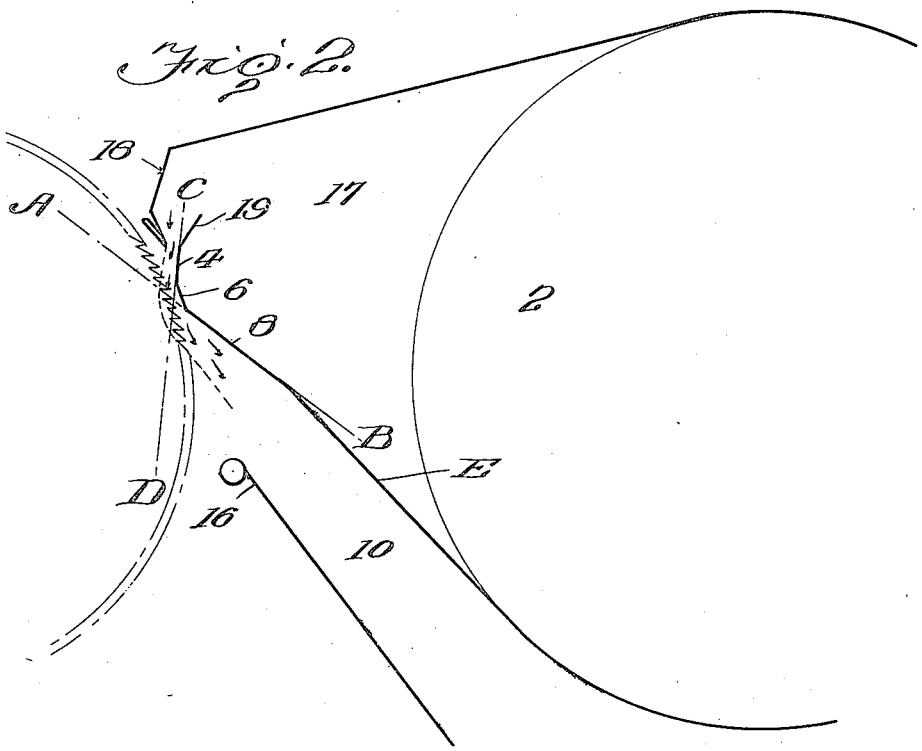

UNITED STATES PATENT OFFICE.

THADDEUS S. GRIMES, OF COLUMBUS, GEORGIA, ASSIGNOR TO LUMMUS COTTON GIN COMPANY, OF COLUMBUS, GEORGIA, A CORPORATION OF GEORGIA.

COTTON-GIN.

1,241,466. Specification of Letters Patent. Patented Sept. 25, 1917.

Application filed June 1, 1915. Serial No. 31,541.

*To all whom it may concern:*

Be it known that I, THADDEUS S. GRIMES, of Columbus, in the county of Muscogee and State of Georgia, have invented certain new and useful Improvements in Cotton-Gins; and I do hereby declare the following to be a full, clear, and exact description of the invention, such as will enable others skilled in the art to which it appertains to make and use the same.

This invention relates to cotton gins, and in particular to cotton gins of the type employing air blasts for stripping the cotton from the gin saws and for discharging it into the lint flues, the invention embodying certain improvements upon the means for directing the blast of air to the gin saws set forth in U. S. Letters Patent No. 910,700, granted January 26, 1909, to R. B. Lumpkin.

The invention covered by said Letters Patent consists in the provision of means designed to positively deflect a current of air issuing from the blast nozzle toward the saws and then deflect it away from the saws, in order to so hold the air current that an effective path for the saws through the air is provided and overcome the tendency of the air to hug the wall of the lint-receiving flue farthest removed from the saws. Under such invention, the direction of the air current was only changed once in its travel from the blast nozzle to the lint flue, and hence it was necessary that the outlet of the nozzle be located at such a distance from the saw teeth as to insure the projection of the stream against the teeth at the proper angle to strip the lint from the teeth. A very important feature of the present invention consists in the provision of deflecting surfaces for the air blasts which are so designed that the current of air, after it issues from the nozzle, is first directed to the saw and held at an angle to a plane tangent to the periphery of the saw, is then caused to change its direction and flow substantially tangential to the saw, thereafter to again change its direction and be discharged from the saw teeth in line with these teeth so as to carry the lint into the lint flue in that direction which will most effectually strip all of the lint from the saw teeth. This I term a "double break" deflector. Finally the air is again deflected back toward the saw.

Several important advantages follow from the above feature of my invention as compared with prior devices of this same general character; for example, by causing two breaks or deflections in the direction of the air current I provide and hold an enlarged stream of air for the saws and am enabled to place the mouth of the nozzle closer to the point at which the lint is removed from the saws, and hence can satisfactorily remove the lint by using an air blast of less size, and may use air under less pressure, than was possible with prior devices where the nozzle was necessarily located a greater distance from the saw teeth nearest the deflector.

Another advantage following from my invention is that I obtain the flow of air at a high velocity over the saw teeth for a longer period of time than occurs in prior devices, which is due to the interval of time that it takes for the saw teeth to move past that portion of the air current which intersects the teeth between the first and second deflections of the current referred to. In other words I hold the current in effective relation to the teeth. Thus a better opportunity is afforded to loosen up and free the lint which is folded around the teeth, whereas if the air current was only deflected once the unfolding of the lint from the teeth and its removal would necessarily have to take place at substantially the same instant of time.

Still a further advantage of the above feature of my invention is found in the fact that it is possible to deflect the air from the saws in the line of the backs of the saw teeth, so as to effectually strip all of the lint therefrom, and carry the same into the lint flue.

Under the preferred embodiment of the invention the air current when it issues from the nozzle is deflected by one deflecting surface arranged at a suitable angle to a tangent to the saw, the current then passes along a second deflecting surface arranged at an angle to the first surface, and which is substantially parallel with a tangent to the saw, and the current is then conducted along still another surface which has substantially the same angular relation to the second deflecting surface as the first deflecting surface has thereto. The air current as it issues from the nozzle under pressure has, as is well known, the natural tendency of a stream of air to go in a straight line. It does not, however, continue in a straight line but follows the deflecting surface and is caused to hug closely thereto by reason of the fact that its high velocity induces all of the air between the air current and the surface of the deflector along which it passes to be rarefied, and such rarefication or partial vacuum renders effective the air pressure and resistance on the opposite side of the stream of air to hold such stream up to the deflecting surface.

Another feature of my invention consists in providing a reverse break in the deflecting surface controlling the discharging air current which forms a part of that wall of the lint flue which is farthest removed from the saws. This results in overcoming the back pressure from the lint flue, and has a tendency to concentrate the air current which discharges lint into that flue so that the mote board may be placed closer to the discharging air stream, or the opening of the flue made smaller.

In the accompanying drawings—

Fig. 2 is an enlarged view of the blast nozzle and deflecting surfaces.

Figure 1:
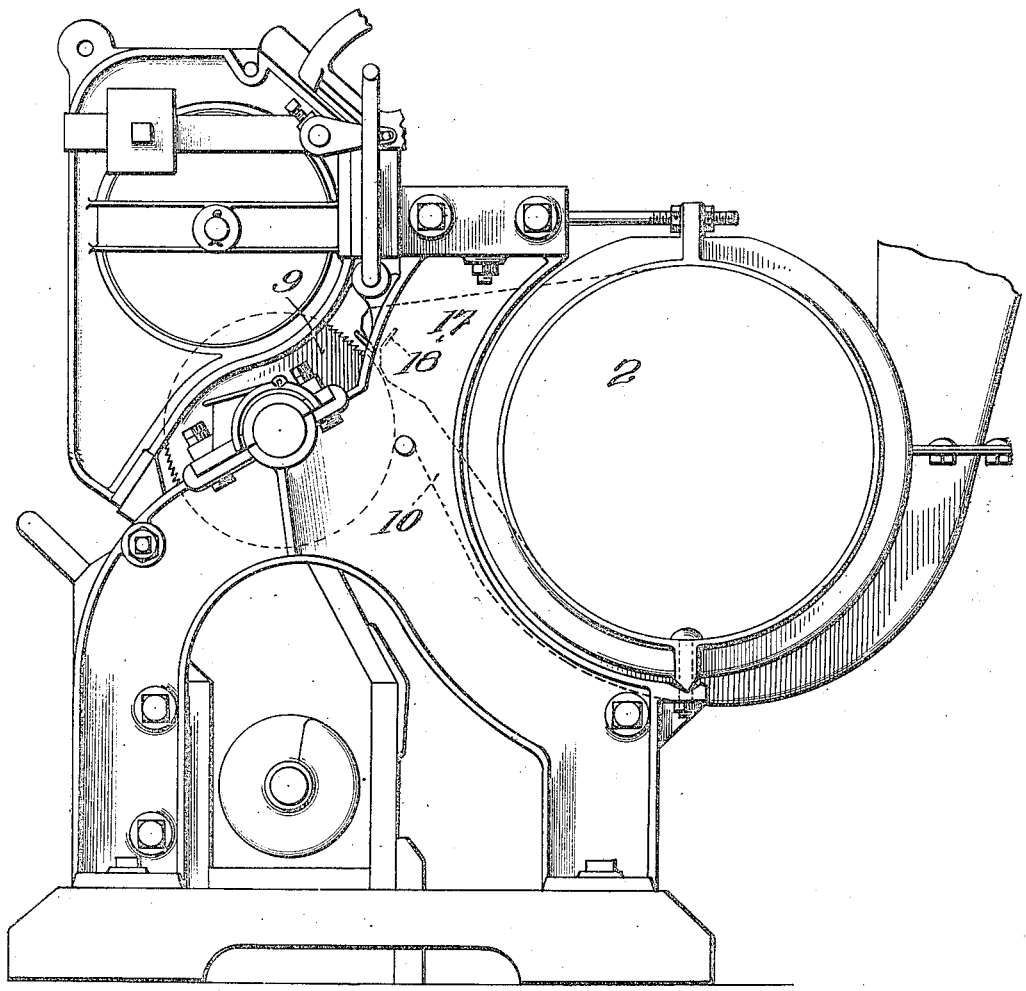
Figure 1 is a side elevation, partly in section, illustrating part of a gin saw together with the blast nozzle and one arrangement of deflecting surfaces for the air current, as contemplated by the present invention.

The frame for supporting the different parts of the gin may be of any preferred construction. In the form shown said frame supports, in suitable bearings thereon, the saw shaft carrying the gin saws 9, a portion of one of which is shown in Fig. 1, and the saw shaft is, as usual, provided with a pulley, or other equivalent device, for receiving power through a belt or the like from any suitable source. Disposed beneath the saws is a lint flue 10 for discharging the lint into the usual lint receptacle or duct which extends the entire length of the frame. The frame supports an air box or receptacle 2, which is arranged longitudinally of the saw-carrying shaft or shafts, and is provided with an air outlet chute or duct 17 terminating in a nozzle 18. The nozzle is preferably of fairly large size at its open, inlet portion, where it is in free communication with the air duct 17 so that a comparatively larger volume of air is conducted to the outlet portion 19 of the nozzle, which, as herein shown, is tapered down to a restricted outlet of appropriate cross section. By the employment of the deflecting surfaces which conduct the air current from the nozzle to the saw, I am enabled to employ a nozzle whose orifice is small as compared with prior constructions, and the volume of air discharged will effectually strip the saw teeth of all lint, thus materially reducing the amount of power necessary to supply the air blast, and hence operating the plant more economically.

The mouth of the nozzle is arranged close to the point where the lint is removed from the saws, and a guiding or deflecting surface 4 leads from the nozzle outlet up to a point near the outer edge of the teeth, a second deflecting surface 6 extends from the surface 4 angularly for a short distance substantially parallel with a tangent to the saw, and thence a third deflecting surface 8 extends from the surface 6 in the direction of the line A—B, which is approximately in line with the backs of the saw teeth as they successively come in alinement with said surface. The surface 8 is continued as that wall of the lint flue which is farthest removed from the saws. The surface 8 preferably presents substantially the same angle to the surface 6 as the surface 4 presents to the said surface 6. The blast of air which issues from the nozzle follows the surface 4 until it reaches the saw teeth, and its direction is such that it passes well down to the roots of said teeth so as to thoroughly loosen up the lint, the current as it is directed along the surface 6 being held in engagement with the teeth for a sufficient time to loosen the lint thereon, and thence traveling along the deflecting surface 8, and discharging in the line of the direction of the saw teeth, into the lint flue. It will thus be seen that there are two breaks in the deflecting surface over which the air current passes during its passage from the nozzle to the lint flue, and by thus deflecting the current, just prior to its entrance into the saw teeth, and also at the moment of its discharge from the teeth, it is possible to locate the blast nozzle close up to the saw teeth, and to use less air at a lower pressure than heretofore, and yet to thoroughly strip the teeth. By this construction also the flow of air at high velocity over those teeth within the zone of action of the air current is prolonged, and in addition the direction of flow of the air current from the saws can be made to aline with the backs of the saw teeth.

The described construction also results in the ability to mote more completely than was possible with prior constructions. As is well known there are small particles of faulty seed, also sand, trash, leaves, sticks and other foreign particles that are pulled through the gin ribs by the saws, and it is desirable, as far as possible, to separate these from the lint. This is accomplished partly by gravity but mainly by centrifugal force. The stream of air between the time it emerges from the nozzle and the time of its discharge into the lint flue induces additional air outside of the nozzle, which tends to carry the motes in the direction of flow; and the air from the nozzle is turned about an angle by the two breaks in the deflector, which is so great that the motes will not be carried with this nozzle current as they have not sufficiently penetrated into it; and they will tend to leave the air streams within a tangent and more particularly in the direction of the line C—D, and be effectually discharged.

The deflecting surface 8 which is continued as the wall of the lint flue farthest removed from the saws is provided with another break at E, from which point the wall is continued downwardly at an angle to the surface 8, and in a direction nearer to the saws. The air which is being discharged along the surface 8 toward the lint flue follows closely this surface until it reaches the break E, from which point onward it will exert more pressure against the surface of the flue because of the tendency to deflect the current from its natural course in a straight line along the surface 8. This slight turning or deflection from its natural course of the discharging current of air has a tendency to concentrate the stream, causing it to have a greater impelling effect to overcome any back pressure in the lint flue and preventing such back pressure from getting between the surface 8 and the stream of air. Another advantage of this feature is that as the current is more concentrated than would be the case if the wall were continued in a straight line from the surface 8, or were curved, I am enabled to use a smaller opening into the lint flue of the gin, and hence may locate the mote board 16 farther from the saws, which thus leaves a wider space for the discharge of the motes, or trash, which come from the saw, and are discharged mainly along the line C—D.

Having thus described my invention, what I claim as new and desire to secure by Letters Patent of the United States is:

1. In a cotton gin, a gin saw, an air supply having a nozzle, a deflecting surface to direct the air current from said nozzle to the saw teeth angularly with respect to a plane tangent to the periphery of the saw, a substantially straight deflecting surface arranged at an angle to the first mentioned surface and occupying a plane parallel with said tangent plane and close to the ends of the saw teeth, and a substantially straight deflecting surface arranged at an angle to the second deflecting surface and approximately in line with said teeth for directing the discharge of the air current from the saw.

2. In a cotton gin, a gin saw, an air supply chute having a deflecting surface formed with a double break, to constitute a plurality of substantially straight portions, one of its portions being adapted to direct an air current to the saw at an angle to a plane tangent to the periphery of the saw, a second portion angularly related to the first mentioned portion and lying substantially parallel with said plane, and a third portion arranged to direct the discharge of the air current, the angle presented by said third and second portions being substantially equal to the angle presented by said first and second portions.

3. In a cotton gin the combination with the gin saws, of an air supply, a nozzle connected therewith and located close to said saws, a plate connected with said nozzle and arranged to hold the air in effective relation to the saw teeth, a plate connected angularly with the first named plate and arranged close to the periphery of said saws, and a third plate connected angularly with the second named plate and arranged to discharge the air in the line of said teeth.

4. In a cotton gin, a gin saw, a lint flue, means for supplying air to the saw for removing the lint therefrom, a deflecting surface having a portion for directing the discharging air current in one direction as it leaves the saw, and another portion angularly related to the first named portion and arranged to deflect the current back toward the saw, said latter deflecting portion constituting a continuation of that wall of the lint flue which is farthest removed from the saw.

In testimony whereof, I have signed this specification in the presence of two subscribing witnesses.

THADDEUS S. GRIMES.

Witnesses:
 Wм. F. Lupo,
 R. L. Bidez.